United States Patent [19]
Babb

[11] 3,964,029
[45] June 15, 1976

[54] INFORMATION RETRIEVAL SYSTEMS
[75] Inventor: Edward Babb, Stevenage, England
[73] Assignee: International Computers Limited, London, England
[22] Filed: Apr. 14, 1975
[21] Appl. No.: 567,643

[30] Foreign Application Priority Data
June 19, 1974 United Kingdom............ 27093/74

[52] U.S. Cl. ............................................ 340/172.5
[51] Int. Cl.² ........................................... G06F 1/00
[58] Field of Search ............................... 340/172.5

[56] References Cited
UNITED STATES PATENTS 3,358,270  12/1967  Crew et al. ................. 340/172.5
3,484,751  12/1969  Cameron et al. ............ 340/172.5

Primary Examiner—Raulfe B. Zache
Attorney, Agent, or Firm—Hane, Sullivan & Spiecens

[57] ABSTRACT

An information retrieval system in which each record in a file is scanned and a hit signal is produced if it matches a search criterion. The hits are stored in a plurality of bit maps. Each record has an identifying index, which is transformed in a number of different ways to produce addresses for the bit maps. The outputs of the bit maps are combined to produce a stored hit signal. The number of hits is compared with the number of stored hits to determine whether any spurious stored hits have been recorded and, if so, the transformations are modified.

8 Claims, 3 Drawing Figures

INFORMATION RETRIEVAL SYSTEMS

BACKGROUND TO THE INVENTION

This invention relates to information retrieval systems.

Information retrieval systems are known in which records are retrieved from a file by searching the file with a search criterion which specifies certain features of the records which it is required to retrieve. The system examines each record in the file (either simultaneously or sequentially), comparing each record with the search criterion and producing a "hit" indication whenever it finds a record which satisfies the search criterion.

It has been proposed to store the hit indications in a register having one bit location for each record in the file, for example to enable the result of one search to be combined with the result of subsequent searches. However, such previous proposals suffer from the disadvantage that, when the number of records in the file is very large (1 million for example) the register must also be very large. One object of the invention is therefore to provide an information retrieval system in which such hit indications are stored in a more economical manner.

In other words, the invention seeks to provide a system in which the total number of bit locations required to store the hit indications is substantially smaller than the number of records, thus leading to a considerable economy in bit locations compared with previous proposals which require one bit per record.

SUMMARY OF THE INVENTION

According to the invention, an information retrieval system comprises: a file store holding a plurality of records each having an index which identifies that record; a plurality of storage areas each having a plurality of individually addressable bit locations, the total number of such locations being smaller than the number of records in the file; means for operating on an index in a plurality of different ways to produce a plurality of addresses, one for each storage area; means for searching the file to compare each record with a search criterion and to produce a hit indication whenever a record is found which satisfies the search criterion; means responsive to a hit indication to write a predetermined pattern of bits into the addressed locations of the storage areas; and means for reading out the contents of the addressed bit locations of the storage areas to produce a stored hit indication in the event that those locations contain the predetermined pattern of bits.

BRIEF DESCRIPTION OF THE DRAWINGS

One embodiment of the invention will now be described by way of example with reference to the accompanying drawings of which.

DESCRIPTION OF THE PREFERRED EMBODIMENT.

Figure 1:
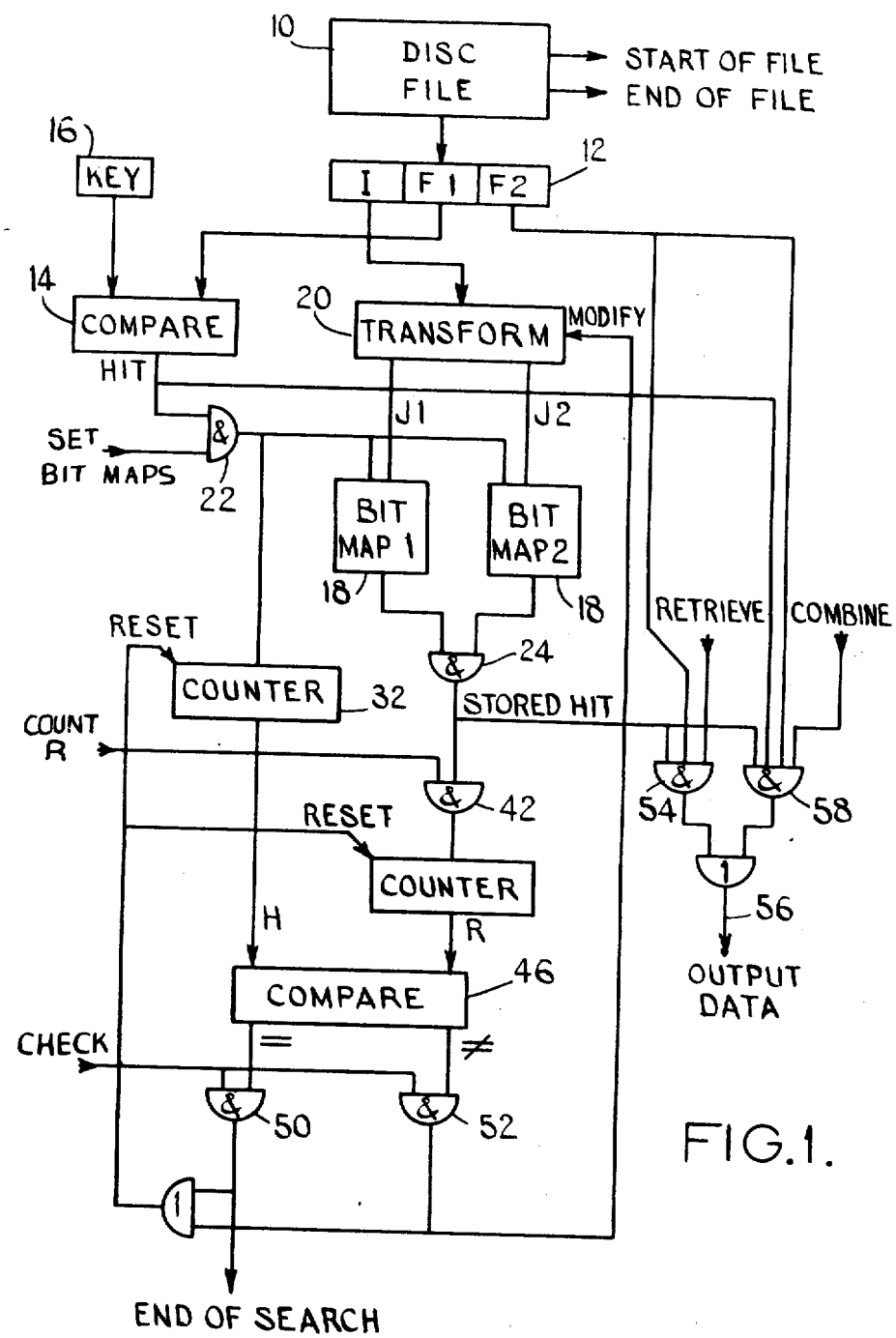
FIG. 1 is a logic circuit diagram of an information retrieval system.

Referring to FIG. 1, the system includes a magnetic disc file unit 10 which holds one or more files, each file comprising a large number of records. Each record contains an index field I, which identifies that record, and various other fields. In a personnel file, for example, each record may relate to an individual employee, with the index field containing the personnel number, and the other fields containing the name, position, salary range etc. of that employee.

The records in the file are scanned sequentially and as each record is scanned it is read into a buffer register 12. For simplicity, the buffer 12 is shown as containing only three fields, I, F1 and F2. The disc file unit also produces two signals START OF FILE, and END OF FILE to indicate the beginning and end of a scan through a file.

As each record appears in the buffer 12, the value of a selected one of the fields (F1 in the present example) is applied to a comparator 14 where it is compared with a search key value held in a register 16. If the field value is equal to the search key value, the comparator produces a HIT signal to indicate that the record in question matches the search key. As will be shown, this permits searches to be made through the file to retrieve records which contain certain specified fields. For example, it is possible to retrieve the records of all employees in a certain salary range.

The HIT signals from the comparator can be stored in an information storage apparatus comprising a number of storage areas 18 (referred to as bit maps), each of which has a number of individually addressable bit locations. In the present example, there are two such bit maps although in general there may be more.

The index field I of the record in the buffer 12 is applied to a transformation unit 20 which operates on the index I in two different ways to produce two transformed indices J1, J2, one of each of the bit maps 18. Each index J1, J2 has a value range equal to the number of bits in the corresponding bit map. The manner in which these transformed indices are produced will be described later with reference to FIG. 3. The indices J1, J2 are applied to the address inputs of their respective bit maps so as to select one location in each map for reading or writing.

The output of the comparator 14 can be applied by way of an AND gate 22 to the write-enable inputs of the two bit maps, so as to cause a binary 1 to be written into the currently addressed locations of the bit maps each time a HIT signal is present. The AND gate is controlled by a SET BIT MAPS signal which is produced by the control circuit of FIG. 2.

The outputs of the two bit maps are combined in an AND gate 24 which provides a binary 1 output only if the contents of the currently addressed locations of the maps are both equal to 1. The output of the AND gate 24 is referred to as the STORED HIT signal, and is taken to signify that a hit has been stored in respect of the record in question. However, as will be shown, this signal may not be a completely unambiguous one: it is possible that a STORED HIT signal may be produced in respect of a record which did not match the search key. The manner in which such spurious STORED HIT signals are removed will become apparent from the following description.

SEARCH COMMAND

Figure 2:
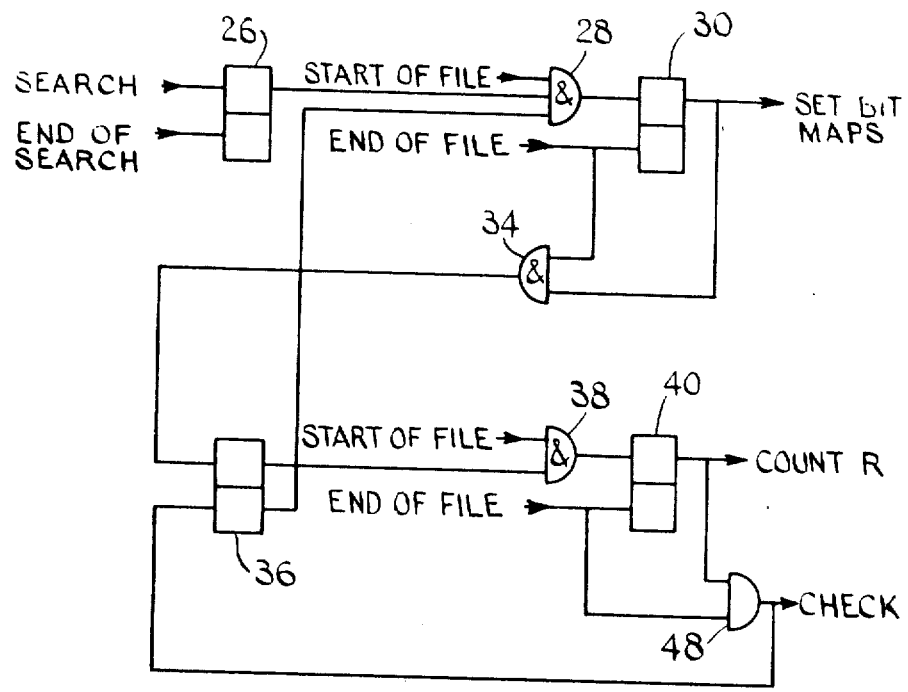
FIG. 2 shows a control circuit for the system.

Referring now to both FIGS. 1 and 2, a search through a file is initiated by inserting the desired key value into the register 16 and applying a SEARCH command to the control circuit of FIG. 2. This command sets a bistable 26. The output of the bistable 26 is applied to an AND gate 28, allowing it to be enabled by the START OF FILE signal from the disc file unit. The output of the AND gate 28 sets a bistable 30, which then produces the SET BIT MAPS signal referred to above.

The file is now scanned, each record being read into the buffer 12 in turn. Whenever the comparator 14 detects a record which matches the search key, it produces a HIT signal which enables and AND gate 22, causing a 1 to be written into the currently selected locations of the bit maps 18. At the same time, a counter 32 (which is assumed to be initially set to zero) is incremented by unity each time a HIT signal occurs.

When all the records have been scanned, an END OF FILE signal is produced by the disc file unit. This signal resets the bistable 30. This removes the SET BIT MAPS signal, preventing any further bits from being written into the bit maps, and preventing any further incrementing of the counter. At this stage, therefore, the bit maps contain a pattern of bits representing the hits produced during the scan, and the counter 32 contains a count of the number H of the hits.

Just before the bistable 30 is reset, the SET BIT MAPS signal, in conjunction with the END OF FILE signal, enables an AND gate 34, causing a bistable 36 to be set. The file is now scanned again. When the START OF FILE signal arrives, an AND gate 38 is enabled, which sets a bistable 40, producing a COUNT R signal. The AND gate 28 is inhibited by the setting of the bistable 36, and so the SET BIT MAPS signal is not produced during this second scan.

The COUNT R signal enables an AND gate 42, which causes each STORED HIT signal to be applied to a counter 44 (assumed to be initially reset), so as to increment the counter by unity.

When the END OF FILE signal occurs again, the bistable 40 is reset, preventing any further incrementing of the counter 44. At this stage, therefore, the counter 44 contains a count of the number R of STORED HIT signals produced during the scan. As mentioned above, this number R is not necessarily equal to the number H of hits in the original scan, but may be larger, due to the production of spurious STORED HIT signals. The contents of the two counters 32 and 44 are applied to respective inputs of a comparator 46 which determines whether or not they are equal.

Just before the bistable 40 is reset, the COUNT R signal, in conjunction with the END OF FILE signal, enables an AND gate 48 producing a CHECK signal. The CHECK signal resets the bistable 36, and is also applied to two AND gates 50 and 52, so as to gate out the result of the comparison of H and R. If H is equal to R, then no spurious hits have been recorded and therefore the bit maps contain an unambiguous representation of the hits. The output of gate 50 thus provides an END OF SEARCH signal, which indicates that the SEARCH command has been completed. The END OF SEARCH signal also resets the bistable 26, preventing further operation of the control circuit, and resets the counters 32 and 44 to zero.

If, on the other hand, H is not equal to R, the contents of the bit maps must be ambiguous; i.e. the production of a STORED HIT output from the bit maps does not guarantee that the record in question produced a hit during the original scan. The output of the gate 52 is therefore applied to the transformation unit 20, so as to modify the transformations in a predetermined manner.

The output of gate 52 also resets the counters 32 and 44, and the bit maps 18.

The file is scanned again. Since bistable 36 is now reset, AND gate 28 will again be enabled by the START OF FILE signal, so as to set bistable 30 and produce the SET BIT MAPS signal. Thus, the bit maps will again be set in accordance with the HIT signals. However, this time the pattern of bits stored in the bit maps will be different from the original one, because of the modification to the transformation unit 20. When this scan is complete, the file is scanned again to count the number R of STORED HIT signals, and a check is again made to see whether there are any spurious stored hits.

This process of scanning the file, comparing R and H, and modifying the transformations will be repeated until eventually equality is detected between H and R. An END OF SEARCH signal will then be produced, terminating the operation.

RETRIEVE AND COMBINE COMMANDS

After a SEARCH command has been completed, information may be retrieved from those records which matched the search key, by means of a RETRIEVE command, which is applied to an AND gate 54. This gate also receives the STORED HIT signal, and the contents of a selected one of the fields of the current record (in this case, field F2).

The file is now scanned, and whenever a STORED HIT signal occurs, the field F2 is gated from the buffer 12 through the AND gate 54 to an output data path 56.

The RETRIEVE command may also be used to retrieve information from a second file on the basis of the results of the search through the first file, providing the records in the second file have index fields which correspond to those of the first file.

The COMBINE command is used to combine the results of two searches. It is assumed that a search has been performed through one file, using the SEARCH command, and the results stored in the bit maps. The COMBINE command is then applied to an AND gate 58 and a second search is performed (either through the same file, using a different search key, or through a different file using the same or a different search key). The AND gate 58 also receives as inputs the STORED HIT signal, the HIT signal, and the contents of a selected field from the buffer 12 (in this case the field F2). It will be seen that the field F2 will be read out on to the output data path 56 for each record which matches the search key and which also produces a STORED HIT signal.

TRANSFORMATION UNIT

Figure 3:
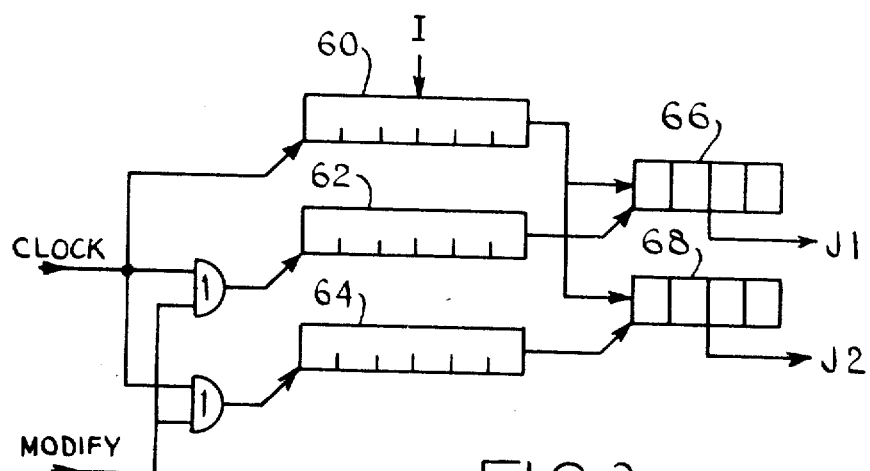
FIG. 3 shows a transformation unit in greater detail.

Referring now to FIG. 3, in this particular system the transformations which produce the indices J1 and J2 are of a pseudo-random nature, and involve selecting a specified combination of the bits of the index I.

The index I is placed in a cyclic register 60. The transformations are controlled by two further cyclic shift registers 62, 64 of the same size as the register 60. In operation, the contents of the three shift registers are all shifted to the right in synchronism, by means of a clock signal. The output bit from the last stage of the register 60 is applied as input to the first stages of two further shift registers 66, 68, which are of smaller size than the other three registers. The output bit from the last stage of the shift register 62 controls the operation of shift register 66: thus, when the output bit from register 62 is 1, the output bit from register 60 is gated into the first stage of register 62 and the contents of the latter are shifted one place to the right. The output bit from the last stage of shift register 64 controls the operation of shift register 68 in a similar manner. The modified J1 and J2 are taken from the registers 66 and 68.

Thus, it will be seen that index J1 if formed by selecting those bits from the index I which correspond to binary 1's in the register 62, while index J2 is formed by selecting those bits which correspond to 1's in the register 64.

The modification of the transformations is performed by rearranging the contents of the registers 62 and 64 in some way. For example, it may be performed by shifting the contents of the registers 62 and 64 relative to the contents of the register 60, so as to alter the selection of bits.

A NUMERICAL EXAMPLE

As an aid to understanding the invention a simplified numerical example will not be considered. The disc file unit 10 is assumed to contain sixteen records, each having a four-bit index I. (In practice, of course, the disc file will, in general, contain many more records than this). It is also assumed that each bit map 18 contains four bit locations each having a two-bit binary address, and that the indices J1, J2 for the two bit maps are initially formed by selecting the first and fourth bits of the index I to form J1, and the second and third bits to form J2. It is also assumed the bit maps are initially reset to zero.

Suppose that, during the search through a file it is found that the record with index I = 1001 matches the search key; this results in a binary 1 being written into the locations addressed by indices J1 = 11 and J2 = 00 in the respective bit maps 18. Suppose that the record I = 1100 is also found to match the search key, so that a binary 1 is also written into the locations J1 = 10 and J2 = 10 in the respective bit maps. Thus, at the end of the search, the two bit maps will contain the following pattern of bits:-

| Address | Bit Map 1 | Bit Map 2 |
|---------|-----------|-----------|
| 00      | 0         | 1         |
| 01      | 0         | 0         |
| 10      | 1         | 1         |
| 11      | 1         | 0         |

The number of H of hits counted during this search is equal to two.

The file will then be scanned again, to count the number R of stored hit signals produced. It can be seen from the above table that the following records will produce an output 1 from both bit maps, and hence will produce a STORED HIT signal from AND gate 24:-

I = 1000, 1001, 1100 and 1101. Thus, the number R is equal to four and is not equal to the number H. This means that some of the STORED HIT signals are spurious: namely, those produced for records I = 1000 and 1101.

It is therefore necessary to modify the transformations in some way. Suppose that the transformations are modified so that the index J1 is now formed by selecting the first and third bits of index I. and index J2 is formed by selecting the second and fourth bits. The search is now repeated, and will result in the following pattern of bits in the bit maps:-

| Address | Bit Map 1 | Bit Map 2 |
|---------|-----------|-----------|
| 00      | 0         | 0         |
| 01      | 0         | 1         |
| 10      | 1         | 1         |
| 11      | 0         | 0         |

It can be seen from this table that the spurious STORED HIT signals have now been eliminated.

Optimum size of bit maps

Even though spurious hits can be eliminated by changing the transformation rules in this way, it is still clearly desirable to keep the number of spurious STORED HIT signals within reasonable limits. In other words, it is desirable to keep the ratio R' = R/H reasonably low (ideally, this ratio should be equal to unity), where:-

H = average number of HIT signals during a scan through file

R = average number of STORED HIT signals.

For reasons of economy, it is also desirable to minimise the total number of bit locations in the bit maps, i.e. to minimise b' = b.n, where n = number of bit maps b = number of bits in each map.

It can be shown that this number b' can be substantially minimised, for a given value of R', by making the number of bit maps approximately equal to:-

$$n_{opt} = \log_e A$$

where $A = r \div H (R'-1)$, and r is the number of records in the file.

The corresponding value of b' is given by:-

$$b'_{opt} = H.e. \log_e A$$

In a typical arrangement in accordance with the invention, a file might contain a million records, and and there might be up to a hundred hits produced in a scan (i.e. r = 106 and H = 100). Putting these values into the above equations shows that, in the optimum case, 9 maps containing altogether 2½ K bits will result in a value of R' 2.2 2.2 retrievals/hit, while 14 bit stores containing a total of 3.7 K bits will give a value R' = 1.01 retrievals/hit. If it was desired to only use two bit maps (which would not be an optimum arrangement, but might be more convenient in some circumstances) the total number of bits required to give a value R' = 2 would be about 20 K bits.

These figures of the number of bit locations required should be compared with the number (1 million) which would have been required if only a single bit map, having one bit per record, were used. Thus, it can be seen that the use of a plurality of bit maps can lead to considerable economy of storage space.

Some possible modifications.

It is possible to overcome the problem of spurious STORED HIT signals in other ways, instead of by modifying the transformations as described above. For example, further bit maps could be provided, for marking the spurious STORED HIT signals.

Alternatively, in some systems it may not be necessary to make any attempt to reduce the number of spurious STORED HIT signals provided the number of spurious signals is not too large, since further tests could be made at the time of retrieval of the data.

In another possible modification of the system, the comparator 14 could be arranged to compare more than one field of the record simultaneously with one or more key values. Moreover, the comparator could test for relationships such as "greater than" or "less than" as well as for equality. The results of these multiple comparisons could then be combined logically to give a HIT signal only if a specified logical combination of relationships were satisfied. This would provide the facility for performing searches with very complex search criteria.

Another possible modification would be to provide a plurality of bit map arrangements, each including its own transformation unit and plurality of bit maps, so as to permit the results of several searches to be stored independently.

Although in the example described above the bit maps 18 were constructed as separate memories, they could be provided by different areas of a single memory, and accessed sequentially rather than in parallel.

In another possible modification, the transformation applied to the index I when reading from the bit maps 18 could be different from those applied during writing.

I claim:

1. An information retrieval system comprising: a file store holding a plurality of records each having an index which identifies that record, a plurality of storage areas each having a plurality of individually addressable bit locations, the total number of such locations being smaller than the number of records in the file; means for operating on an index in a plurality of different ways to produce a plurality of addresses, one for each storage area; means for searching the file to compare each record with a search criterion and to produce a hit indication whenever a record is found which satisfies the search criterion; means responsive to a hit indication to write a predetermined pattern of bits into the addressed locations of the storage areas; and means for reading out the contents of the addressed bit locations of the storage areas to produce a stored hit indication in the event that those locations contain the predetermined pattern of bits.

2. A system according to claim 1, further including means for counting the number of hit indications produced during a scan through the file, means for counting the number of stored hit indications produced during a subsequent scan through the file, and means for comparing these two numbers and, if the latter number is larger than the former, modifying the operations performed on the index, the scanning and modifying being repeated until the two numbers are found to be equal.

3. A system according to claim 1, wherein the storage areas are provided by respective separate memory devices, and are addressed simultaneously.

4. A system according to claim 1, wherein the means for operating on the index comprises means for selecting a plurality of different combinations of the bits of the index.

5. A system according to claim 1, further including means responsive to stored hit indications for retrieving a specified item of data from those records which produce such indications.

6. A system according to claim 1, further including means responsive to stored hit indications and to hit indications, for retrieving a specified item of data from records which produce both such indications.

7. A system according to claim 1, wherein the number of storage areas is substantially equal to $$n_{opt} = \log_r A$$

where
$A = r \div H (R^1 - 1)$
$r =$ the number of records in the file
$H =$ the average number of hit indications produced during a scan through the file
$R^1 = R/H$ and
$R =$ the average number of stored hit indications produced during a scan through the file.

8. A system according to claim 7, wherein the total number of bit locations in the storage areas is substantially equal to $$b_{opt} = H.e.\log_e A$$

* * * * *